United States Patent
Roy et al.

(10) Patent No.: US 9,699,088 B2
(45) Date of Patent: Jul. 4, 2017

(54) SERVICE PLAN BASED FLOW CONTROL

(71) Applicant: Hughes Network Systems, LLC, Germantown, MD (US)

(72) Inventors: Satyajit Roy, Gaithersburg, MD (US); Zhao Chan Lin, North Potomac, MD (US); Amit Arora, Clarksburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 131 days.

(21) Appl. No.: 14/537,079

(22) Filed: Nov. 10, 2014

(65) Prior Publication Data

US 2016/0134544 A1    May 12, 2016

(51) Int. Cl.
*H04L 12/26* (2006.01)
*H04L 12/801* (2013.01)
*H04B 7/185* (2006.01)
*H04L 29/06* (2006.01)
*H04L 12/863* (2013.01)
*H04L 12/851* (2013.01)
*H04W 88/16* (2009.01)

(52) U.S. Cl.
CPC ............. *H04L 47/14* (2013.01); *H04B 7/185* (2013.01); *H04L 69/16* (2013.01); *H04L 47/24* (2013.01); *H04L 47/2441* (2013.01); *H04L 47/623* (2013.01); *H04W 88/16* (2013.01)

(58) Field of Classification Search
USPC ............... 370/347–352, 401–468, 223–235; 709/223–241
See application file for complete search history.

(56) References Cited

U.S. PATENT DOCUMENTS 5,359,593 A * 10/1994 Derby ................. H04L 12/5602
370/234
5,633,861 A * 5/1997 Hanson ............... H04L 12/5602
370/232

(Continued)

FOREIGN PATENT DOCUMENTS

EP    1553740 A1    7/2005

OTHER PUBLICATIONS

International Search Report and the Written Opinion for International App No. PCT/US2015/059775, mailed Feb. 17, 2016, Authorized Officer: Rubio Hide, Felipe.

*Primary Examiner* — Man Phan
(74) *Attorney, Agent, or Firm* — Sheppard Mullin Richter & Hampton LLP; Daniel Yannuzzi; Jonathan Marina

(57) ABSTRACT

Systems and methods are provided to achieve traffic flow control in accordance with traffic priority as well as service plan considerations. A weight for flow control and a per service plan minimum flow control meter (FCM) can be defined for different throttle rates for different service plans. An FCM value based upon traffic priority can be converted to a per service plan group FCM value so that each service plan can be assigned/configured with its own FCM for each uplink queue. An average throttled data rate is then calculated to determine whether the traffic in a particular gateway is under or over throttled based on the current per service plan FCM with current input data rates. The per service plan FCM can then be revised for use by an Internet Protocol Gateway sending traffic to a Satellite Gateway.

18 Claims, 15 Drawing Sheets

(56) References Cited

U.S. PATENT DOCUMENTS

| | | | | |
|---|---|---|---|---|
| 6,185,619 B1* | 2/2001 | Joffe | ................... | G06F 9/505 |
| | | | | 709/223 |
| 6,473,793 B1* | 10/2002 | Dillon | ................ | H04B 7/18584 |
| | | | | 370/235 |
| 6,487,212 B1* | 11/2002 | Erimli | ................... | G06F 5/06 |
| | | | | 370/230 |
| 6,826,150 B1* | 11/2004 | Bhattacharya | .......... | H04L 47/10 |
| | | | | 370/230 |
| 7,095,715 B2* | 8/2006 | Buckman | ................ | H04L 12/14 |
| | | | | 370/230 |
| 7,562,130 B2* | 7/2009 | Dillon | ................ | H04B 7/18584 |
| | | | | 709/223 |
| 7,979,571 B2* | 7/2011 | Dillon | .................... | H04L 47/10 |
| | | | | 709/232 |
| 8,549,135 B1* | 10/2013 | Yazdani | .................. | H04L 47/35 |
| | | | | 709/224 |
| 2003/0174650 A1* | 9/2003 | Shankar | .............. | H04L 12/5693 |
| | | | | 370/235 |
| 2005/0163048 A1* | 7/2005 | Arora | ..................... | H04L 47/10 |
| | | | | 370/230 |

* cited by examiner

DETERMINE A PER SERVICE PLAN GROUP FLOW CONTROL METER (FCM) VALUE APPLICABLE TO ALL SERVICE PLANS IN A SERVICE PLAN GROUP
200

DETERMINE A PER SERVICE PLAN FCM VALUE FOR EACH OF THE SERVICE PLANS IN THE SERVICE PLAN GROUP
202

ADJUST THE PER SERVICE PLAN FCM VALUE TO ACCOUNT FOR TRAFFIC PRIORITIES ASSOCIATED WITH THE SERVICE PLANS
204

| | Service Plan Type | Throttle Rate based on Service Bucket Group | Min CIR % (based on Service Plan) | Offered Load | Traffic Mix |
|---|---|---|---|---|---|
| User A | Low Value | High throttle rate (Low value service) | Same | Same | Comparable |
| User B | High Value | Low throttle rate (High value service) | Same | Same | Comparable |

|  | Service Plan Type | Throttle Rate based on Service Bucket Group | Min CIR % (based on Service Plan) | Offered Load | Traffic Mix |
| --- | --- | --- | --- | --- | --- |
| User A | Low Value | N/A | 25% | High (at PIR) | Comparable |
| User B | High Value | N/A | 50% | High (at PIR) | Comparable |

| | Service Plan Type | Throttle Rate based on Service Bucket Group | Min CIR % (based on Service Plan) | Offered Load | Traffic Mix |
|---|---|---|---|---|---|
| User A | Low Value | Same | Same | Low | Low priority traffic |
| User B | High Value | Same | Same | High (at PIR) | High % of low priority traffic |

|  | Service Plan Type | Throttle Rate based on Service Bucket Group | Min CIR % (based on Service Plan) | Offered Load | Traffic Mix |
|---|---|---|---|---|---|
| User A | Low Value | Same | Same | Same | High % of high priority traffic |
| User B | High Value | Same | Same | Same | High % of low priority traffic |

| | Service Plan Type | Throttle Rate based on Service Bucket Group | Min CIR % (based on Service Plan) | Offered Load | Traffic Mix |
|---|---|---|---|---|---|
| User A | Low Value | Same | N/A | Same | High % of high priority traffic |
| User B | High Value | Same | N/A | Same | High % of low priority traffic |

SERVICE PLAN BASED FLOW CONTROL

TECHNICAL FIELD

The present disclosure relates generally to broadband networks. More particularly, some embodiments of the present disclosure are directed toward systems and methods for achieving flow control, e.g., traffic throttling, in the context of both service plans and traffic priority.

BACKGROUND

A wholesaler of satellite bandwidth can provide bandwidth to various Internet service providers, and can also offer multiple service plans. A service provider can, in turn, sell Internet service to end users, where the end users may be consumer or enterpriser customers. These service plans are often designed to meet the needs of various markets, and can provide, e.g., download speeds in the range of 512 kbps download speeds to 15 Mbps download speeds.

Currently, in the event of outroute congestion (i.e., offered traffic to be delivered to end users exceeds the available outroute capacity of a satellite), traffic can be throttled based on classifications of traffic to ensure that the highest priority traffic is delivered with optimal latency (i.e., the least amount of delay). Lower priority traffic that is throttled may incur higher latency and packet loss. In the event of spoofed Transmission Control Protocol (TCP) traffic, throttling can also result in a reduction of the TCP window advertised to an enterprise host. Classification is typically determined by Internet Protocol (IP) packet classification using IP and Performance-enhancing proxies (PEP) packet selection rules. Within the context of priority, there is currently no distinction in the throttling of traffic as a function of a service plan. That is, all service plans are equally impacted in a manner proportional to the subscribed information rate of a service plan.

SUMMARY

Systems and methods are provided in various embodiments for performing traffic throttling in the context of traffic priority and service plans. In accordance with one embodiment of the technology disclosed herein, a method of traffic throttling comprises determining a per service plan group flow control meter (FCM) value applicable to all service plans in a service plan group. The method further comprises determining a per service plan FCM value for each of the service plans in the service plan group. Moreover, the method comprises adjusting the per service plan FCM value to account for traffic priorities associated with the service plans.

In accordance with another embodiment of the technology disclosed herein, a system for traffic throttling comprises a plurality of Internet Protocol Gateways (IPGWs). The system further comprises a satellite gateway (SGW) configured to transmit and receive data packets to and from the plurality of IPGWs, the SGW controlling traffic flow by transmitting flow control messages to each of the plurality of IPGWs. Each of the plurality of IPGWs is configured to throttle the traffic flow to the SGW during periods of outroute congestion by performing the following: determine a per service plan group flow control meter (FCM) value applicable to all service plans supported by the system in a service plan group; determine a per service plan FCM value for each of the service plans in the service plan group; and adjust the per service plan FCM value to account for traffic priorities associated with the service plans.

Other features and aspects of the disclosure will become apparent from the following detailed description, taken in conjunction with the accompanying drawings, which illustrate, by way of example, the features in accordance with various embodiments. The summary is not intended to limit the scope of various embodiments, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
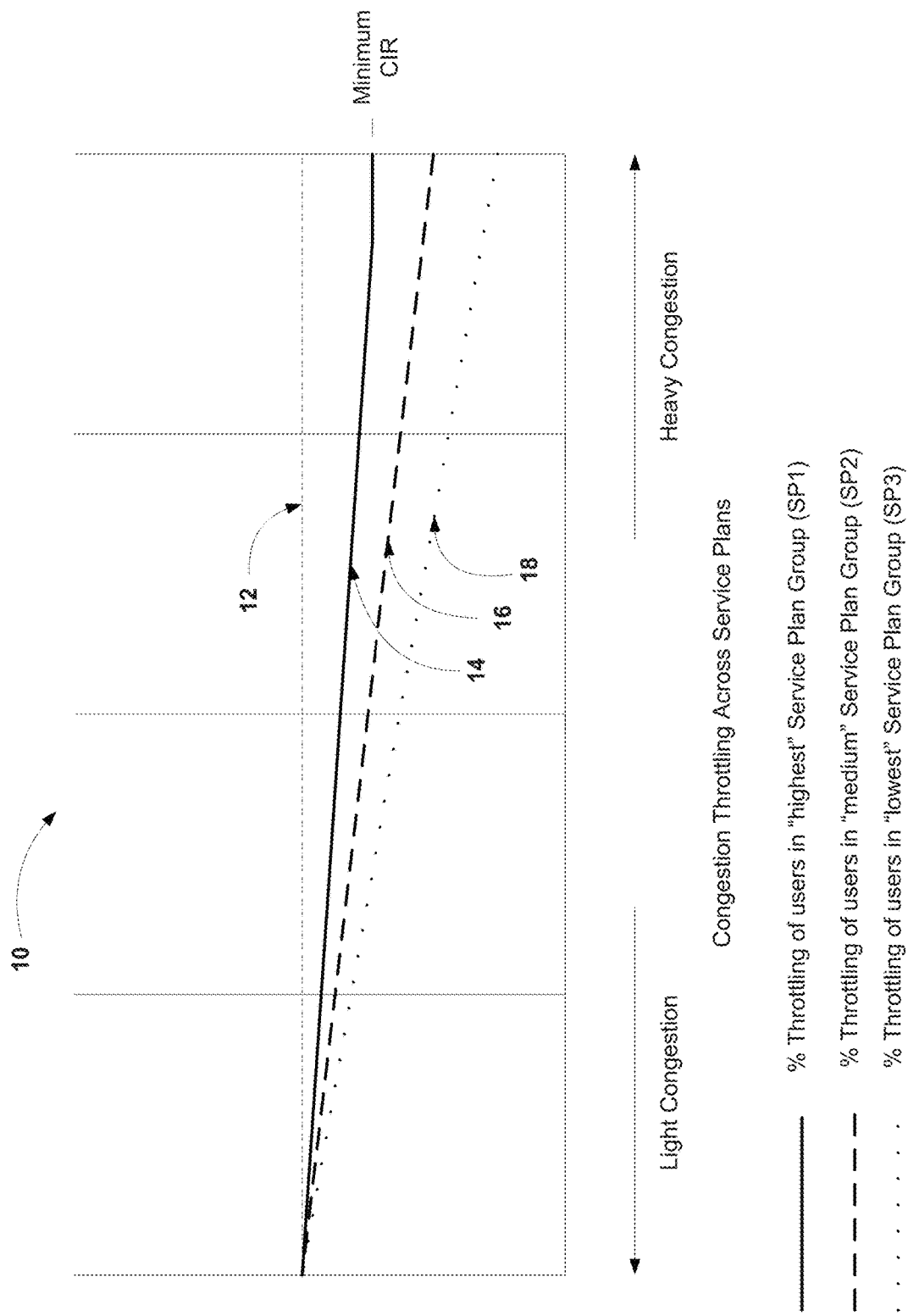
FIG. 1 is a graphical representation of throttling across service plans in accordance with various embodiments of the technology disclosed herein illustrates an example satellite data transmission system.

The figures are not intended to be exhaustive or to limit various embodiments to the precise form disclosed. It should be understood that various embodiments can be practiced with modification and alteration, and that the disclosed technology be limited only by the claims and the equivalents thereof.

DETAILED DESCRIPTION

Various embodiments of the systems and methods disclosed herein provide mechanisms for categorizing service plans based on service-plan value (e.g., high-value service plans versus lower-value service plans), and implementing traffic flow control in the context of service-plan value as well as traffic priority. That is, service providers may now have the ability to offer differentiated services in the event of outroute congestion such that higher value service plans may be less impacted by outroute congestion than lower value service plans when delivering a comparable traffic mix. Moreover, this differentiation can occur within the context of or take into account, traffic prioritization. That is, assuming a comparable traffic mix, higher value services will be less impacted by outroute congestion. Additionally, lower value services with a large proportion of high priority traffic may also be impacted less in terms of outroute congestion than higher value services that are currently only transmitting lower priority traffic. It should be noted that when a system is uncongested, i.e., a current outroute capacity is enough to carry the demands from/of all active users, each user will still see their offered traffic load (concurrent traffic that could be carried/queued traffic) sent over the outroute.

To achieve the aforementioned differentiated service, an Internet service provider system, such, for example, as a satellite-based Internet service provider system, can utilize a concept based upon service plan groups (which can also be referred to herein as 'buckets'). In particular, a service plan group can refer to a group of service plans with similar throttling weight (i.e., having a similar 'value' to the customer). In accordance with one embodiment, up to six such service plan groups may be configured per outroute connection or link. Across multiple outroutes, service plan groups may contain different sets of service plans.

In accordance with one embodiment, traffic throttling can be achieved as follows. Configuration parameters that can be referred to as 'weight for flow control' and a 'per service plan minimum flow control meter (FCM)' can be defined for different throttle rates for different service plans. A 'basic' FCM value can be converted to a per service plan group FCM value. The per service plan FCM can be obtained by taking the larger of the per service plan group FCM value and a minimum per-service-plan FCM. Accordingly, each service plan can be assigned/configured with its own FCM for each uplink queue. An average throttled data rate is then calculated to determine whether the traffic in a particular gateway is under or over throttled based on the current per service plan FCM with current input data rates. A delta FCM can be used to adjust the per service plan FCM, and a revised per service plan FCM can be generated. Accordingly, the proper FCM can be applied to a service plan so that the per gateway average throttled rate is zero.

FIG. 1 is an example graph 10 illustrating the effects of traffic throttling in accordance with various embodiments. Line 12 can represent traffic flow in a system in an uncongested state, i.e., without throttling implemented on the outroute. Lines 14, 16, and 18 can represent the throttling effect on various service plan groups SP1, SP2, SP3) in terms of the percentage of users throttled in each of the service plan groups. The slope of lines 14, 16, 18, in FIG. 1 can represent the degree of throttling applied to the service plan groups. The area to the left of graph 10 can be representative of light congestion while the area to the right of graph 10 can be representation of heavy congestion. As can be appreciated, traffic throttling can be increased when traffic moves from lower to heavier congestion (proceeding from left to right), until the offered traffic load has been throttled to match the available capacity. A decrease in throughput (throttling) for higher-value service plan groups at any instant of time is generally less than that for lower value service plan group users.

In addition, each service plan within a service plan group may be defined with a minimum committed information rate (CIR) as a percentage of the current rate in effect. CIR is mechanism that an Internet service provider may use to guarantee a user a particular amount of bandwidth despite a shared bandwidth pool, regardless of how must a link (outroute) may get. CIR can be provided on a subscription basis, where a greater CIR can be associated with a more expensive subscription plan. As utilized herein, the term 'current rate' can refer to the subscribed CIR in an un-throttled or normal state (line 12), and a configured soft-throttled rate during Soft Throttling. Two service plans may be configured with the same subscribed CIR and the same 'slope' or percentage of throttling (same service plan group), but have different minimum CIRs.

As described above, during outroute congestion, a system can increase the throttling of traffic until the delivered or carried traffic load matches the available capacity. If the service plans are configured with the same slope of degradation (i.e., the service plans belong to the same service plan group), the throttling of traffic will be the same for those two plans. However, if the applied throttling has reached a point where the system is delivering only the minimum CIR for a service plan, throttling can be suspended for that service plan, while throttling can be continued for service plans with experienced usage that is higher than their minimum CIR.

Two factors can influence the extent of throttling during the congestion period. The first factor can be considered to be a static relative weight (i.e., the aforementioned flow control weight) assigned to service plan groups that is used to apply differentiated throttling across users from different service plans. The second factor can be the volume of traffic associated with each service plan group. The actual reduction in traffic achieved as the system progresses down the slope can be a function of the amount of traffic available to be throttled. The system dynamically determines the extent to which it must proportionally throttle traffic based on the configured weights such that the total forwarded traffic rate across all service plans is closely equal to the current target outroute capacity at any instant in time.

As described above, a system in which various embodiments of the technology disclosed herein can be applied is an Internet service provider system. An example of such a system is now described, where the system can be a digital video broadcast satellite network such as a DVBS-2 based geosynchronous earth orbit satellite network. DVB-S2 is a digital television broadcast standard developed by the DVB project (an industry consortium), and ratified by the European Telecommunications Standards Institute (ETSI) envisioned for broadcasting services, interactive services including Internet access, and data content distribution. In such a network, the IP layer and link gateway may be referred to as the IP gateway (IPGW) and the satellite gateway (SGW), respectively. The data stream may be broadcast to remote network nodes such as Very Small Aperture Terminals (VSATs).

Figure 2:
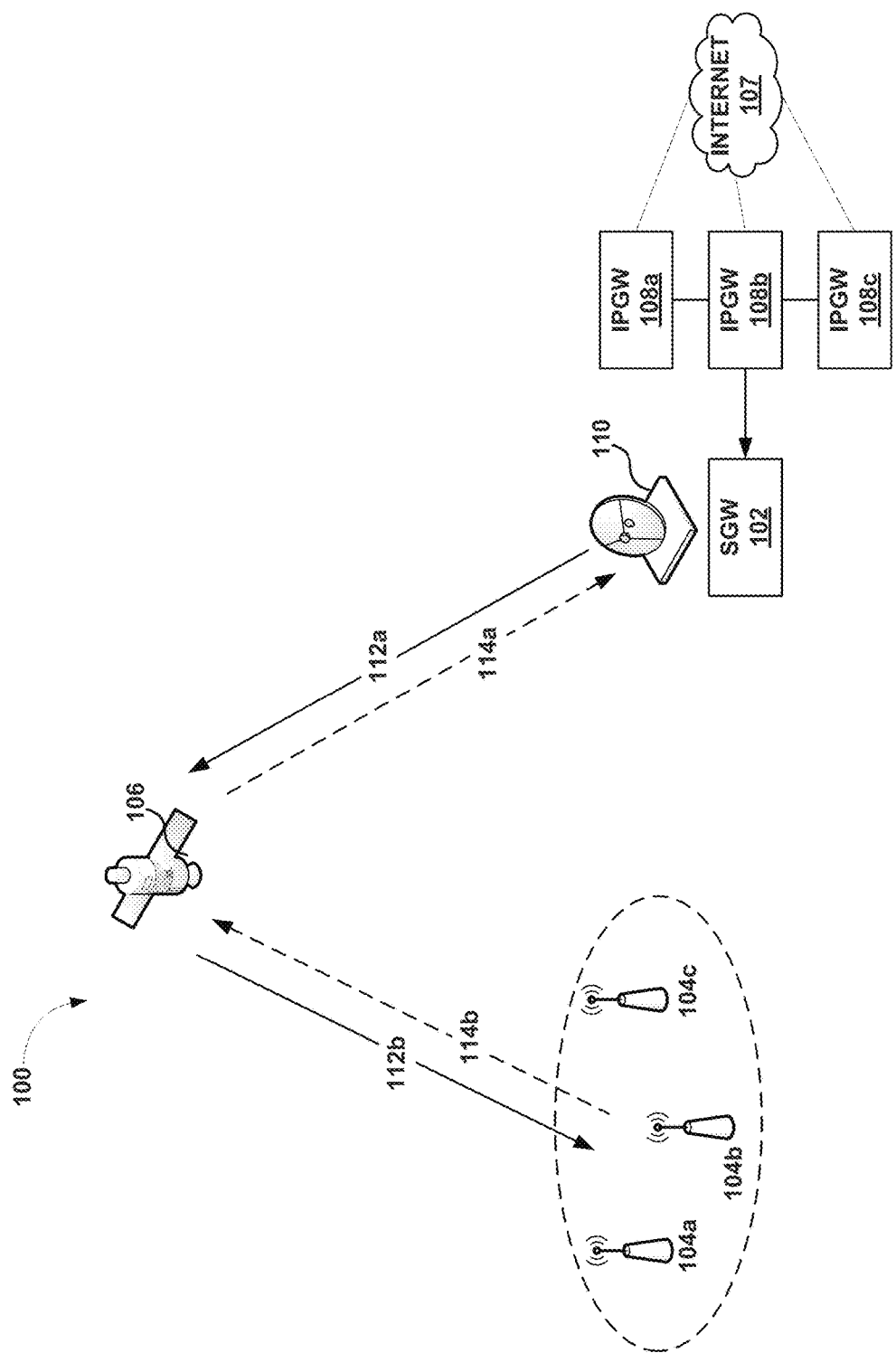
FIG. 2 illustrates an example satellite data transmission system in which various embodiments of the technology disclosed herein may be implemented.

FIG. 2 illustrates an example multi-IPGW, single Code Rate Organizer (CRO), satellite network 100 in which elements involved in outroute communications/traffic are described. A CRO can refer to a module/component of an SGW that organizes the transmission and receipt of data packets via access to a radio resource based on the respective modulation and coding rate such that spectrum utilization can be optimized. The CRO may dynamically estimate bandwidth capacity in terms of data rate and organize incoming data from IPGWs into a multiplexed data stream so as to fully utilize the spectrum bandwidth for transmission. The multiplexed data stream can then be broadcast to remote terminals associated with the CRO. Satellite network 100 in this example can include a satellite ground station or SGW 102, remote terminals 104a, 104b, and 104c, a satellite 106, an internet 107, IPGWs 108a, 108b, and 108c, and an RF terminal 110. The satellite network may be a shared access broadband network. Other types of shared access networks may include, for example, wireless networks such as 4$^{th}$ Generation Long Term Evolution (4G LTE) and WiMAX networks, which may include terminals other than VSATs, such as cellular and WiFi equipped devices.

SGW 102 may be connected to remote terminals 104a-104c via satellite 106. Feeder links may carry data between SGW 102 and satellite 106, and may include a forward uplink 112a for transmitting data from SGW 102 to satellite 106, and a return downlink 114a for transmitting data from satellite 106 to SGW 102. User links may carry data between satellite 106 and remote terminals 104a-104c, and may include a return uplink 114b for transmitting data from remote terminals 104a-104c to satellite 106, and a forward downlink 112b for transmitting data from satellite 106 to remote terminals 104a-104c. The forward uplink 112a and the forward downlink 112b may form an outroute, and the return uplink 114b and the return downlink 114a may form an inroute. SGW 102 may include high capacity earth stations with connectivity to ground telecommunications infrastructure. SGW 102 may be communicatively connected to RF terminal 110. RF terminal 110 may include an antenna, electronics and connectivity to allow communications access to satellite 106. RF terminal 110 may include the physical equipment responsible for sending and receiving signals to and from satellite 106, and may provide an air interface for SGW 102.

Each of remote terminals 104a-104c can be, for example, VSATs and may connect to the Internet through satellite 106 and SGW 102. For example, remote terminal 104a may be used at a residence or place of business to provide a user with access to the Internet. VSATs or Mobile Satellite Terminals (MSTs), may be used by end users to access the satellite network, and may include a remote satellite dish for receiving RF signals from and transmitting RF signals to satellite 106, as well as a satellite modem and other equipment for managing the sending and receiving of data. They may also include one or more remote hosts, which may be computer systems or other electronic devices capable of network communications at a site remote from SGW 102.

Satellite 106 may be any suitable communications satellite. For example, satellite 106 may be a bent-pipe design geostationary satellite, which can accommodate innovations and variations in transmission parameters, operating in the Ka-band. Satellite 106 may use spot beams as well as frequency and polarization reuse to maximize the total capacity of satellite network 100. Signals passing through satellite 106 in the forward direction (toward remote terminals 104a-104c) may be based on the DVB-S2 standard (ETSI EN 302 307) using signal constellations up to and including at least 16-APSK. The signals intended to pass through satellite 106 in the return direction (toward terminals 104a-104c) may be based on the Internet Protocol over Satellite (IPoS) standard (ETSI TS 102 354). Other suitable signal types may also be used in either direction, including, for example higher data rate variations of DVB-S2.

IPGWs 108a-108c may include an ingress portion of the local network at SGW 102. Data from outside SGW 102 may enter SGW 102 through IPGWs 108a-108c. IPGWs 108a-108c may each include a TCP spoofer, which may acknowledge TCP/IP traffic, sent to SGW 102. Moreover, SGW 102 may be connected to an internet through IPGWs 108a-108c. IP traffic, including TCP traffic, from the internet may enter SGW 102 through IPGWs 108a-108c. As illustrated in FIG. 1, multiple IPGWs (e.g., IPGWs 108a-108c) may be connected to a single SGW (e.g., SGW 102), sharing the bandwidth of RF terminal 110. At each of IPGWs 108a-108c, real-time (RT) and non-real-time (NRT) traffic flows may be classified into different priorities. These traffic flows may be processed and multiplexed before being forwarded to priority queues at SGW 102. RT traffic may go directly to an RT priority queue or SGW 102, while NRT traffic flows may be serviced based on the respective priority and volume. Data may be further packed into DVB-S2 code blocks and stored in a code block buffer before transmission.

Data from an internet intended for a VSAT (e.g., remote terminals 104a-104c) may be in the form of IP packets, including TCP packets and User Datagram Protocol (UDP) packets, or any other suitable IP packets, and may enter SGW 102 at any one of IPGWs (e.g., IPGW 108a), where the respective TCP spoofer may send an acknowledgement back to the sender of the TCP/IP packets. The IP packets may be processed and multiplexed by SGW 102 along with IP packets from the other IPGWs (108b and 108c), where IPGWs 108b and 108c may or may not have the same service capabilities and relative priorities. The IP packets may then be transmitted to satellite 106 on forward uplink 112b using the air interface provided by RF terminal 110. Satellite 106 may then transmit the IP packets to a VSAT using forward downlink 112a. Again, this may be the outroute. Similarly, IP packets may enter the ingress at a VSAT, be processed by the VSAT, and transmitted to satellite 106 via the VSAT's air interface on return uplink 114a. Satellite 106 may then send the IP packets to SGW 102 using return downlink 114a. This may be the inroute.

At IPGWs 108a-108c, higher layer data packets for multiple remote terminals 104a-104c may be queued and scheduled for transmission at the lower layers. The scheduled packets can be forwarded to multiplexing queues at SGW 102. SGW 102 can perform Satellite Link Control (SLC) and Medium Access Control (MAC) functions for data transmission over forward uplink 112a. A key component of an SGW (alluded to previously) is a CRO, which as described previously, organizes data transmission to access a certain radio resource based on the respective modulation and coding rate such that spectrum utilization can be optimized. It should be noted that although a remote terminal may receive the entirety of the data stream, the remote terminal only accesses its own part via specific addressing.

A certain spectrum resource of a satellite spot beam covering a geographical area can be associated with one CRO in accordance with satellite network 100. In other words, a particular remote terminal at a certain location is generally served by only one CRO at a time. A satellite beam may have multiple CROs associated with it by virtue of splitting the spectrum.

Conventional flow control works within the context of traffic priority. That is, the traffic is flow controlled by the SGW by sending messages to an IPGW to reduce the amount of data being sent. The flow control messages are sent out by SGW, e.g., every 100 ms (which can be a configurable value) and received by all IPGWs that serve traffic to that SGW.

The flow control message contains the latency information of an SGW's priority queues, i.e., the time duration that packets are waiting in each of the priority queues. Based on the latency value in the flow control message, the IPGWs take appropriate actions to reduce (during congestion) or increase (when congestion is abating) the traffic presented to the SGW.

Each of the SGW's priority queues may be mapped to one or more IPGW outroute uplink priority queues. The IPGW may have four uplink queues corresponding to four PEP backbones. Use of a PEP feature can improve throughput and response time of TCP applications while minimizing bandwidth by dynamically determining available bandwidth and packet loss and automatically adjusting to current traffic conditions. That is, PEP spoofs the TCP connection handshake so that data can be forwarded without waiting for an end-to-end connection establishment. It should be noted that a PEP backbone can refer to an established connection between two end points to support the carrying of spoofed TCP data using a PEP Backbone Protocol (PBP). A typical configuration is to have the same IPGW uplink queues mapped to the same SGW priority queues to ensure that lower priority applications get throttled equally across all IPGWs first before the higher priority applications in the system are affected.

Figure 3:
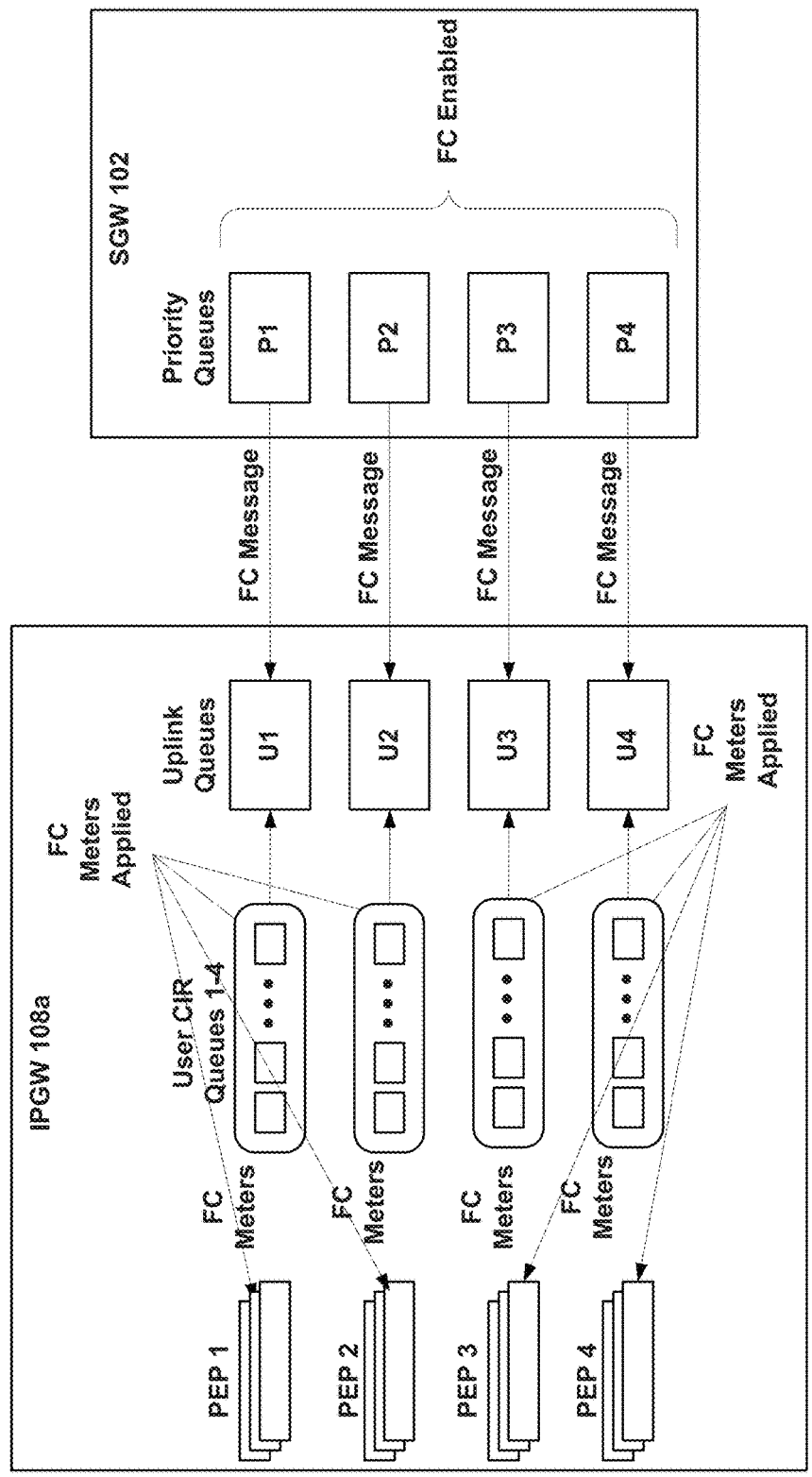
FIG. 3 illustrates an example of conventional outroute flow control.

As shown in FIG. 3, traffic from four application priority queues (also called user CIR Queues) of each user are mapped into four uplink queues (U1-U4) of an IPGW, e.g., IPGW 108a of FIG. 2. These four queues are then mapped into four separate priority queues (corresponding P1-P4) in the SGW, e.g., SGW 102 of FIG. 2. The flow control is enabled on each priority queue (P1-P4). These four application priority queues (User CIR Queues 1-4) in the IPGW 108a correspond to four PEP backbones or PEP priorities PEP1-PEP4.

The SGW 102 continuously measures the average queuing latency being experienced by packets on each of its priority queues (P1-P4). Periodically, and, e.g., every 100 ms, the SGW 102 sends Flow Control Messages reporting the queue latency for each priority queue (P1-P4) to the IPGWs, one of which may be IPGW 108a. The IPGW 108a adds the average of its uplink queue latency to the queue latency for each priority queue (P1-P4). Thus, the average latency of a priority queue is calculated as the sum of the average latency received from an SGW for the priority queue and the average latency of the IPGW uplink queue corresponding to the SGW priority queue.

There can be several configured parameters in the IPGW that drive how the IPGW reacts to the average latency. This flow control algorithm in the IPGW is based upon an FCM calculation from the average latency information, where the parameters are as follows: 1) a latency threshold can refer to a parameter that is used to determine when an IPGW should apply flow control on traffic (an example default value being 200 ms); 2) a target latency weight (in %) which can refer to a weight that is applied to the difference between the current average latency and the target latency threshold (an example default value being 10%); 3) a delta latency weight (in %) which can refer to a weight that is applied to the difference between the previous and current average latency within a sample period (an example default value being 7%); 4) a normalization factor which can be used to normalize the result of the first and second order terms of the flow control algorithm (an example default value being 0.1); and 5) a minimum FCM, which can go up to a configured minimum value (an example default value being 1).

If the value of the average latency of a priority queue exceeds a configurable threshold, the IPGW will begin to implement flow control on the uplink queue. A flow control approach is used in the IPGW with adequate normalization to ensure that the flow control applied is as smooth as possible and works towards avoiding large flow control-induced burstiness. The FCM is calculated within the IPGW as a percentage, and can be calculated separately for each priority queue. An FCM of 100% refers to a situation when no flow control is applied to the priority queue.

Once the FCM value is determined to be less than 100 for the queue, the following actions can be taken. The first action of the IPGW in response to the flow control message is to adjust the per-user CIR, which governs the rate at which the IPGW forwards traffic to the SGW. This will serve to reduce the load being fed into the SGW. The second action that can be taken is to adjust the PEP backbone transmit window to throttle spoofed traffic being transmitted towards the user CIR queues within the IPGW. Lastly, the third action to be taken is to adjust the TCP window size advertised to the internet hosts on the enterprise host, which is relevant because the window size in TCP packets is used to reduce the incoming load into the IPGW.

When the average latency of a priority queue increases, the IPGW decreases the per-user CIR for traffic having that priority. Conversely, when the average latency subsequently decreases, the IPGW increases the per-user CIR for all the users equally having that priority.

The FCM for each priority is initialized to 100%. A new FCM may then be calculated every time the IPGW receives the flow control message (containing the per priority queue average latency) from the SGW. Each of the four IPGW uplink queues is then configured with a minimum value for the FCM.

Calculating the FCM is performed using the following algorithm, which is separately executed for each uplink queue. The current average latency is available per every 100 ms sample period.

The target delta and delta latency may be calculated as follows.

Target delta=Current average latency−latency threshold (configured)

Delta latency=Current average latency−Average latency calculated in previous sample period Next, the first term and the second term flow control factors are calculated and added or subtracted from the previous FCM to determine a new FCM. The two (first and second term) factors work together to ensure a smooth decrementing or incrementing of the FCM, which in turn ensures a smooth decrease or increase of throughput. The first and second term flow control factors may be obtained as follows.

First term factor=Target delta*Target latency weight

Second term factor=Delta latency*Delta latency weight

After applying the aforementioned normalization factor, the normalized FCM may be calculated.

New FCM=Previous flow control meter−((First term factor+Second term factor)*Normalization factor)/100

New FC meter=MIN(100, MAX(Minimum configured FC meter, Calculated FC meter)

If the average latency of a priority queue remains greater than the threshold and the latency continuously increases, the FCM decreases continuously from the previous value until it reaches the configured minimum. On the other hand, if the average latency remains less than the threshold and the latency continuously decreases, the FCM increases continuously from the previous value until it reaches 100.

However, there are instances where the FCM can decrease or increase from the previous value even when the reported average latency is less than or greater than the threshold, respectively. In a case where the average latency that is reported is greater than the threshold, but is less than the previous sampled latency by a significant enough amount, this indicates that the load is decreasing. The flow control algorithm takes this into account to ensure smoothness in throttling traffic.

As mentioned previously, the FCM is applied in three places by the IPGW. That is, the IPGW takes a packet from each user CIR queue, and depending upon the uplink priority associated with that user CIR queue, it applies the FCM calculated for that priority queue. The user packet length that is used to calculate how much CIR has been left for a user is artificially changed—either increased in the case of the FCM being decremented during congestion or decreased from the previous value when the FCM is increased, i.e., congestion is getting better as specified below.

CIR left for user A−=(IP packet length (from priority i)*100/Current FC meter of priority i)

Thus, when the FCM decreases, the IP packet length is artificially increased to greater than its actual length. Therefore, the user CIR left is decreased by more than what it should be in a normal case. This reduces the forwarding rate of user packets to the SGW and aids in improving congestion. On the other hand, when congestion is getting better, the FCM increases and the IP packet length begins increasing beyond value used during congestion. The FCM incrementing process ultimately normalizes the CIR left for the user when congestion is gone.

The FCM is also applied to the PEP. As discussed above, there can be four PEP backbones for each user. These four PEP backbones have correspondence to the four uplink/priority queues (U1-U4/P1-P4). The PEP flow control adjusts the PEP TCP spoofing kernel (TSK) window and PBPK transmit window to adjust receiving traffic from the IPGW's Internet and/or Intranet sources and also traffic transmitting to the Satellite interface.

As alluded to previously, various embodiments provide differentiated CIR throttling across users during congestion or bandwidth contention within an outroute/beam. This is done so that the throughput of users from higher flow control service plan groups suffer less than that from lower flow control service plan groups.

In implementing the above differentiated CIR throttling, a configuration screen can be introduced in the network management system (NMS) through which an operator can create a set of flow control service plan groups. Each service plan group can be configured with a percentage value relative to the highest priority service plan group so that differentiated throttling can be applied during times of congestion to service plans under different flow control service plan groups.

The percentage value configured for each flow control service plan group refers to how much more flow control (in %) will be applied to a specific service plan group compared to the highest priority service plan group. The percentage value of the highest flow control service plan group can always be set to 0 (preset by NMS and not modifiable) and service plans belonging to it are the least flow controlled. The percentage value of any other flow control service plan groups indicates that plans belonging to a specific service plan group are flow controlled more by that percentage compared to plans under the highest flow control service plan group.

An algorithm calculates differentiated CIR FCMs (one for each traffic priority) for each service plan within a flow control service plan group taking into consideration the static weight of the flow control service plan group to which a service plan belongs, the relative volume of traffic on that flow control service plan group, and the minimum flow control percentage configured for that service plan.

In accordance with various embodiments, when a flow control message is received from the SGW, base FCMs are calculated. The base FCM refers to the value calculated without taking weighting factors into consideration. The base FCM is calculated using the aforementioned (conventional) algorithm. During an uncongested state, the FCM remains at 100 and no flow control is applied. The base FCM is available for each priority queue and per priority base FCM is the same for all users.

The differentiated CIR FCMs are calculated every flow control cycle after obtaining the base FCM, thereby including consideration for service plans in addition to the conventional/base FCM that only considers traffic priority. That is, FCMs for those priorities having base FCM values less than 100 are 'revised' in accordance with a revised algorithm for calculating the differentiated CIR FCMs. The revised FCM brings differentiated throughput throttling across users. The revised FCM is first calculated for each flow control service plan group and then for each service plan belonging to one of the service plan groups. Since different minimum flow control percentages can be configured for different service plans, the service plan based FCM calculation is performed when FCM calculations per flow control service plan group is not sufficient.

In this way, the revised algorithm is able to achieve the distribution of FCMs across flow control service plan groups based on configured percentage differentiation and volume such that by doing it on an average, the system can achieve the same effective flow control if the base FCM were being applied to all traffic without differentiation.

In particular, and again, a (base) FCM is a value calculated based on the latency in a SGW's outroute priority queue which involves a one-to-one mapping to the four uplink queues in an IPGW. In the aforementioned example illustrated in FIG. 3, there are four FCMs utilized in the IPGW, one FCM being calculated per priority. When the SGW flow control feature is enabled, the FCM is applied to calculate the bandwidth available for a user. A smaller FCM will inflate the bandwidth more. Again, during normal times without congestion, the FCM is 100. During times of outroute congestion, the FCM can fall below 100. Thus, bandwidth is deflated, user traffic is throttled, less packets will be enqueued to the SGW, and eventually the congestion will be abated.

To incorporate different throttle rates for different service plans/FAPs during times of congestion, two configuration parameters can be introduced, i.e., a weight for flow control (w) of a service plan group, and a per-service-plan minimum FCM (mFCM). Configuration of these two parameters can produce different throttle rates for different service plans.

Figure 4:
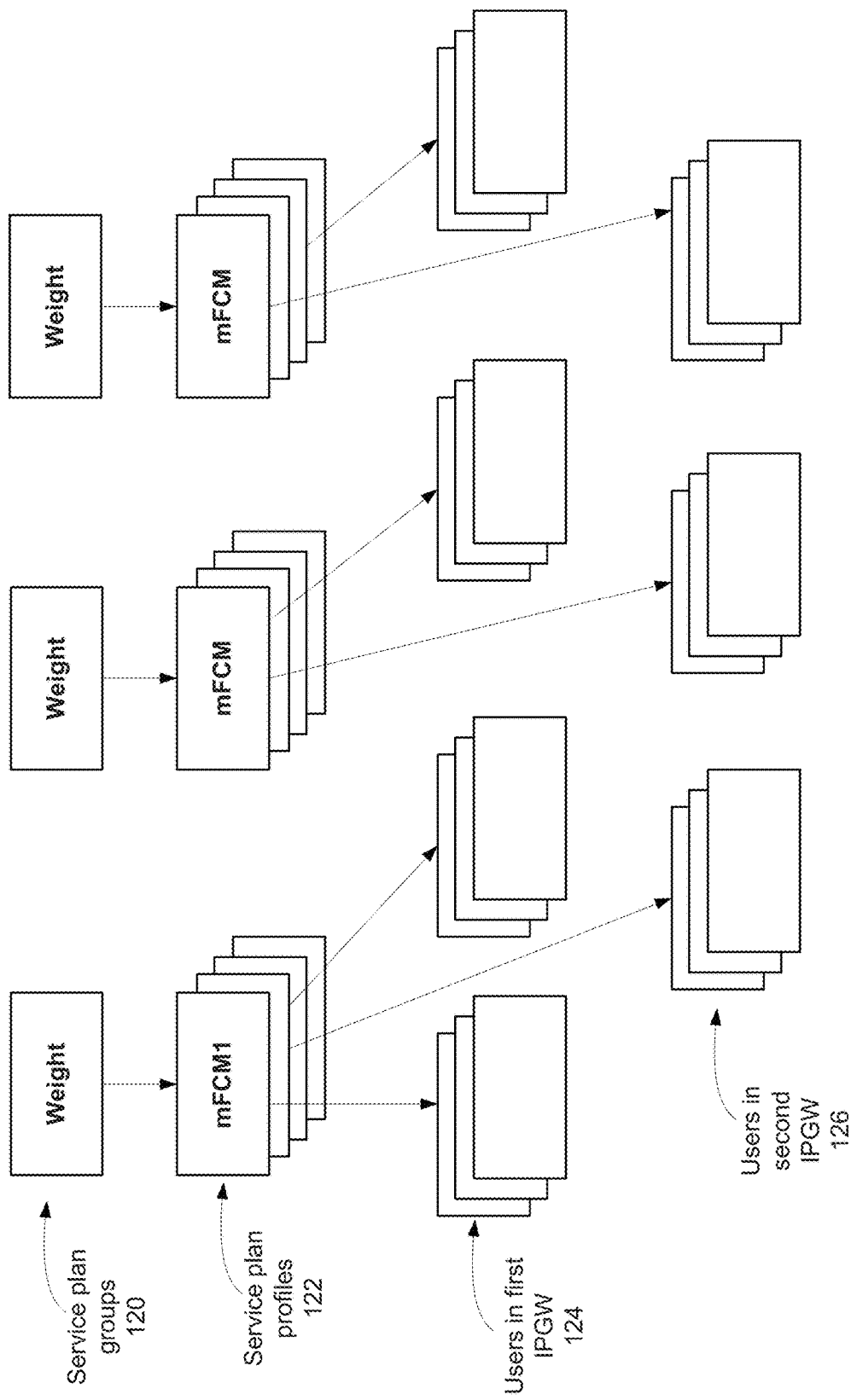
FIG. 4 is a diagrammatic representation of configuration parameter hierarchy utilized in accordance with various embodiments of the technology disclosed herein.

FIG. 4 illustrates an example hierarchy of service plan groups 120, service (FAP) plans 122, IPGWs and Users/VSATs (124 and 126 which correspond to first and second IPGWs, e.g., IPGWs 108a and 108b of FIG. 2), where service plans are grouped by their values into service plan groups.

Flow control weight is configured per service plan service plan group. The flow control weight specifies the weight, w, based on which FCM will be adjusted for a specific service plan. The value is a percentage. The larger the value, the larger the FCM that is applied, and thus the traffic will be throttled less. Service plan groups with weights more than 100 are called high value service plan groups, while service plan groups with weights less than 100 are called low value service plan groups. Service plans belonging to the same service plan group share the same weight, and thus, have same per service plan group flow control meter (denoted as gFCM), which can be obtained with the following equations:

$$gFCM[p,g]=FCM[p]*w[g]/100 \quad \text{Equation 1}$$

The variable p is the priority of the uplink queue. The variable g is the service plan group ID.

Figure 5:
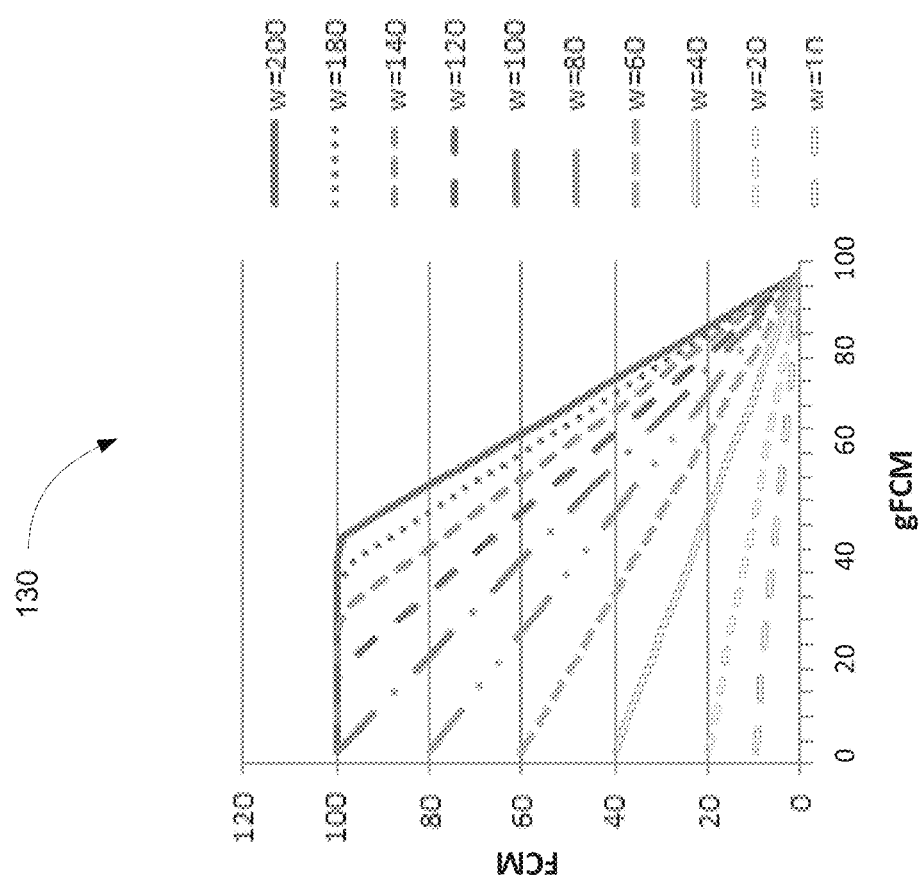
FIG. 5 is graphical representation of example effects of weighting on the flow control meter value in accordance with various embodiments of the technology disclosed herein.
Figure 6:
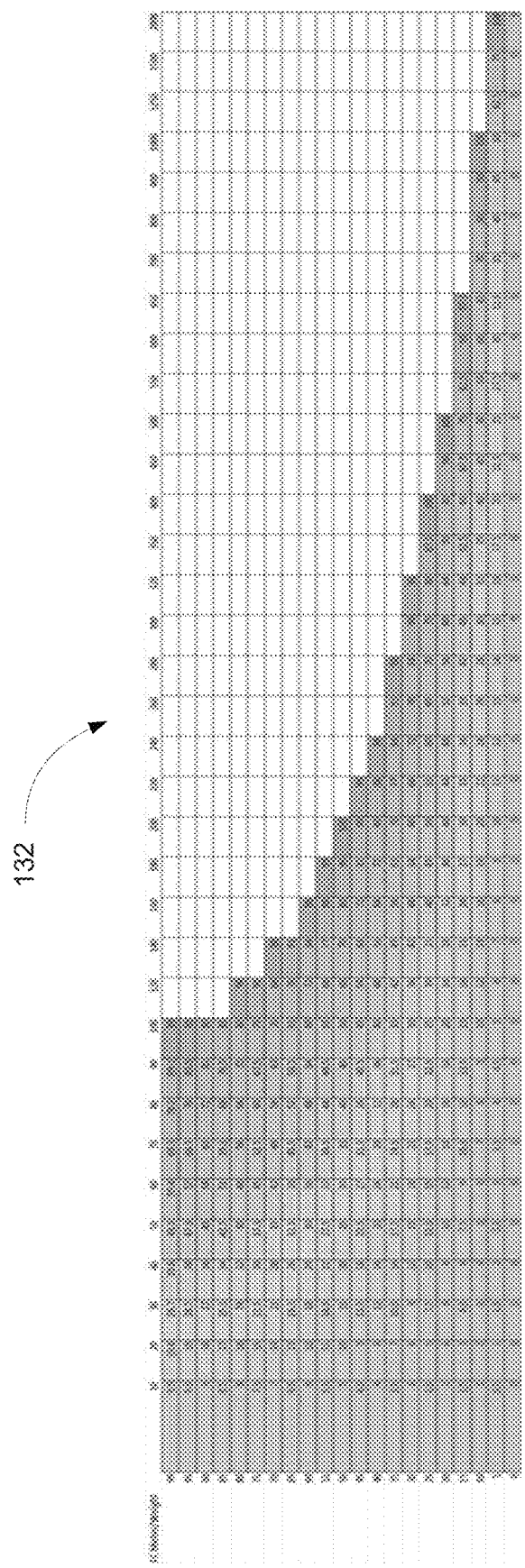
FIG. 6 is a graphical representation of an example mapping of service plan group weights to per service plan group flow control meter values in accordance with various embodiments of the technology disclosed herein.

FIG. 5 is a graph 130 illustrating how weight, w, changes the value of the FCM, where the x axis is representative of FCM values and the y axis is representative of gFCM values. Again, w=100 indicates that no adjustment to the base FCM is received. For a high value service plan group with w=200, traffic is throttled only when the FCM received falls below 50. For a low value service plan group with w=40, traffic will be throttled to an FCM value of 40 as soon as the received FCM falls below 100. FIG. 6 illustrates a chart 132 indicating an example mapping of service plan group weight to $FCM_{bucket}$ for different FCM values.

The minimum FCM (mFCM) is configured per service plans. The purpose of the mFCM is to set the floor for the FCM for a specific service plan so that the FCM will not go below a certain predetermined value. With the mFCM, the user belonging to a service plan will receive a bandwidth allocation no lower than approximately the mFCM percentage of the maximum CIR configured when there are bandwidths available in the system. It should be noted that the mFCM is not enough to guarantee the minimum CIR, and it is impractical to guarantee minimum CIR for the Best Effort users, especially in an oversubscribed network. Thus, in one example, the revised algorithm attempts to achieve the minimum CIR, without necessarily guaranteeing that the it can be achieved.

A per-service-plan FCM (sFCM) is obtained using the following equation:

$$sFCM[p,f]=MAX(mFCM[f], gFCM[p,g]) \quad \text{Equation 2}$$

The variable f is the service plan ID.

Accordingly, every service plan is assigned its own FCM for each uplink queue using the following equation:

$$sFCM[p,f]=f(FCM[p], w[g], mFCM[f]) \quad \text{Equation 3}$$

A per-IPGW average throttled data rate ($bw_{avg}$) is a number in kbps used to show whether traffic is under or over throttled with the current w and mFCM configured for a particular service plan. The per-IPGW average throttled data rate is calculated using the following equation:

$$bw_{avg}=\Sigma((sFCM[f]-FCM)*(BW[f]*N[f])) \quad \text{Equation 4}$$

In the above equation, FCM is the per priority or base FCM, the sFCM[f] is the aforementioned per-service-plan FCM, and the parameter BW[f] is the runtime input data rate, where the maximum input data rate is limited to the service plan configured un-throttled data rate. The parameter N[f] is the number of users within an IPGW that belong to the service plan, such that BW[f]*N[f] is the per service plan total input data rate.

Figure 7:
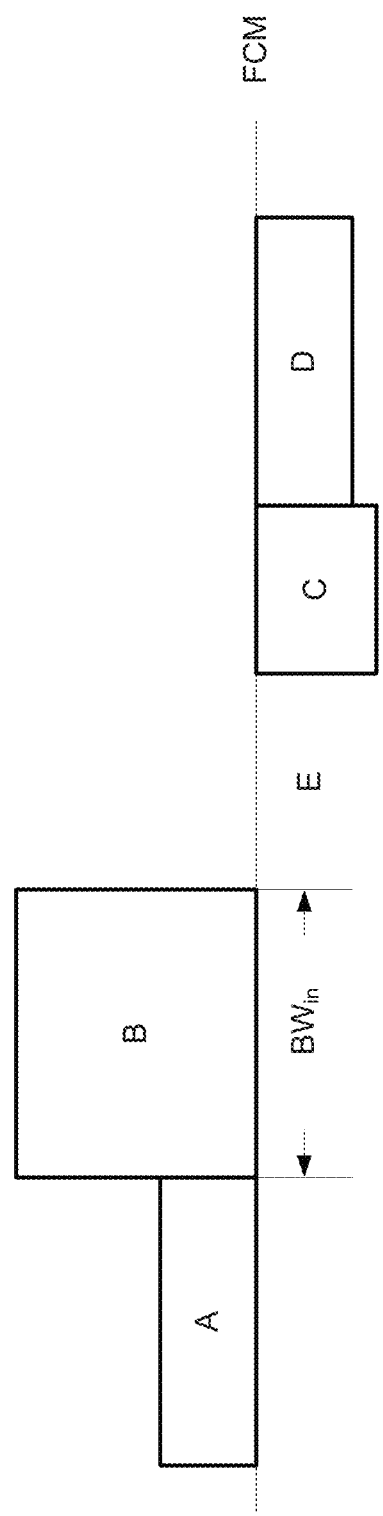
FIG. 7 is a diagrammatic representation of an averaged throttled data rate in accordance with various embodiments of the technology disclosed herein.

FIG. 7 is a diagrammatical representation defining the average throttled data rate $bw_{avg}$. For example, there can be five service plans, A, B, C, D and E. A and B can be high value service plans, C and D can be low value service plans, and E can be plan associated with a weight, w, equaling a value of 100. The corresponding areas A, B, C, D, and E are the product of $BW_{in}*(sFCM-FCM)$. That is, areas A and B have positive values because their sFCM is larger than the base FCM. Areas C and D have negative values because their sFCM is smaller than the base FCM. Area E is zero, because FCM−FCM=0. The average throttled data rate $bw_{avg}$ is the sum of the products. In accordance with one embodiment, a preferred configuration results in the sum of areas, i.e., $bw_{avg}$ approaching a small value, e.g., ±10% of the total IPGW throughput.

During configuration, the BW[f] is the service plan configured un-throttled data rate. The configuration parameters can be adjusted based on the average throttled data rate $bw_{avg}$. If the average throttled data rate $bw_{avg}$ is positive, it suggest that traffic is under throttled, and that the service plan group (bucket) weight, mFCM or the number of service plans in the high value service plan group needs to be decreased. If $bw_{avg}$ is negative, it suggests that traffic is over throttled, and the service plan group weights of low value service plan groups should be increased.

During runtime, the $bw_{avg}$ value is calculated based on the current sFCM with the current input data rates. The delta FCM will be used to adjust the sFCM value. The value of the delta FCM can be calculated based on the following equations:

$$dFCM_{global}=(-1)*bw_{avg}/\Sigma(BW[f]*N[f]) \quad \text{Equation 5}$$

$$dFCM[f]=MAX(0, dFCM_{global}*(sFCM[f]*N[f]/\Sigma sFCM[f]*N[i]))) \quad \text{Equation 6}$$

$$sFCM[f]'=sFCM+dFCM[f] \quad \text{Equation 7}$$

The parameter $dFCM_{global}$ is the delta FCM of a specific priority queue in the IPGW. The parameter dFCM[f] is the delta FCM of a service plan in a specific priority queue. The parameter sFCM[f]' is the adjusted per-service-plan FCM.

It should be noted that the runtime sFCM adjustment is performed to handle over throttled situations, e.g., when a large portion of traffic is traffic from low value plan users and a very little portion of the traffic is from high value plan users. Without the sFCM adjustment, the available bandwidth will not be fully utilized.

Again, service plan based flow control allows for the throttling of lower value service plans greater than higher values service plans. As previously discussed, various embodiments are directed to configuring the system such that service plan group weights and the per service plan mFCM have values that result in the per IPGW average throttled rate equal zero. Referring back to Equation 4, various embodiments implement increased throttling of low value service plans in order to allow for high value service plans to be throttled less. It should be noted, however, that it is possible to have insufficient traffic volume from lower value service plans to compensate for the extra bandwidth given to the higher value service plans, the closed loop system of the flow control mechanism disclosed herein addresses such scenarios. That is, the system may become further congested and the SGW packet lost ratio may increase, in which case the system can automatically adjust the throttling rate/FCM based on the traffic volume.

Accordingly, total and per flow control service plan group traffic volume are calculated per CIR enforcement cycle, which in accordance with one example, can be configured as 33 ms. A short term simple moving average (SMA) is sufficient for the calculation of traffic volume. Thus, the average volume $V_{total,j}$ and $V_{i,j}$ at time t can be expressed as SMA over past $N_0$ CIR enforcement periods. The default value is $N_0=1$ or 3. For an instant response, $N_0=1$.

$$V_{total,j} = \frac{\sum_{n=t-N_0+1}^{t} V_{total,j}(n)}{N_0}$$

$$V_{i,j} = \frac{\sum_{n=t-N_0+1}^{t} V_{il,j}(n)}{N_0}$$

The variable i refers to service plan group grade, e.g., i=1 refers to the highest grade service plan group while i=N refers to the lowest grade service plan group. The variable j refers to the priority queue, e.g., priority queues 1, 2, 3, and 4.

As described above, the rate at which an end user will experience "throttled" service during periods of congestion will depend on the following factors: the configured throttle rate for a service plan group; the configured minimum CIR rate for a service plan (defined as a percentage); the offered load from the end user with respect to its subscribed CIR; and the traffic mix of the offered load with respect to traffic having various priorities.

Figure 8:
FIG. 8 is a flow chart illustrating example operations performed for throttling traffic in accordance with various embodiments of the technology disclosed herein
Figure 8:

FIG. 8 is a flow chart illustrating example operations performed to achieve traffic throttling accounting for service plans and traffic priorities in accordance with various embodiments of the technology disclosed herein. At operation 200, a per service plan group FCM value is determined for each service plan in a service plan group (i.e., service plan group). As described above, the per service plan group FCM value can be calculated based on the traffic priority based FCM value adjusted with an applicable flow control weight. At operation 202, a per-service-plan FCM value is determined for each of the service plans in the service plan group. That is, a minimum FCM value that his configured per service plan is compared to the per service plan group FCM value, and the larger of the two FCM values is taken. Accordingly, each service plan can be associated with its own FCM value for each uplink queue, the per service plan group FCM value being a function of the base/priority FCM value, the flow control weight, and the minimum FCM value. At operation 204, the per-service-plan FCM value is adjusted to account for traffic priorities associated with the service plans. In particular, and as described above, an average throttled data rate/bandwidth can be calculated based on the per-service-plan FCM value, runtime input data rate, and the base/traffic priority FCM value, as well as the number of users within an IPGW belonging to the service plan. Additionally, delta FCM values are calculated and the per-service-plan FCM value is adjusted based on the delta FCM values.

The following use case scenarios illustrate the application of the flow control handling disclosed herein. For illustrative purposes, these use case scenarios make the following assumptions: high value service plans are configured to be throttled at a lower rate than low value service plans; there are four application priorities configured in the system; and the traffic from each user is classified into one of four priority queues (P1, P2, P3, P4).

Figure 9A:
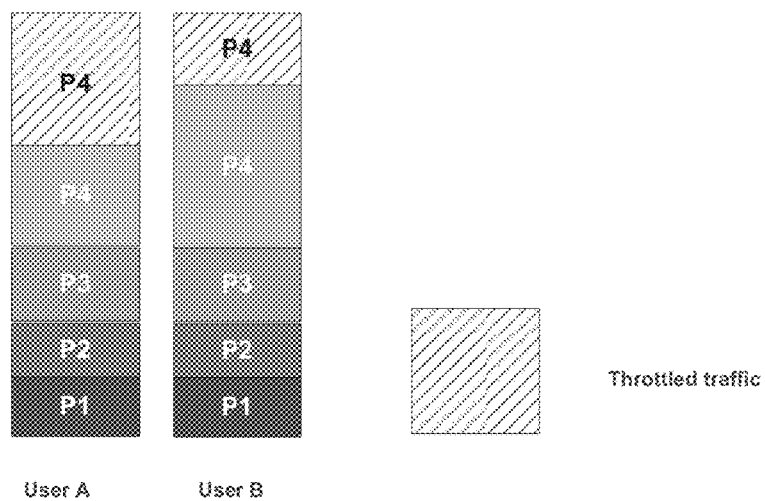
FIG. 9A is a diagrammatic representation of throttling and a corresponding table of conditions in accordance with a first embodiment of the technology disclosed herein.

FIG. 9A illustrates an example use case scenario in which the impact of a configured throttle rate is shown when determining flow control action. User A is subscribed to a low value service plan with a high throttle rate. User B is subscribed to a high value service plan with a low throttle rate. At some instant of time during a period of congestion, Users A and B have the same amount of overall demand and a comparable traffic mix (traffic of varying priorities). User A will experience a higher degree of throttling for the traffic in the P4 priority queue than User B.

Figure 9B:
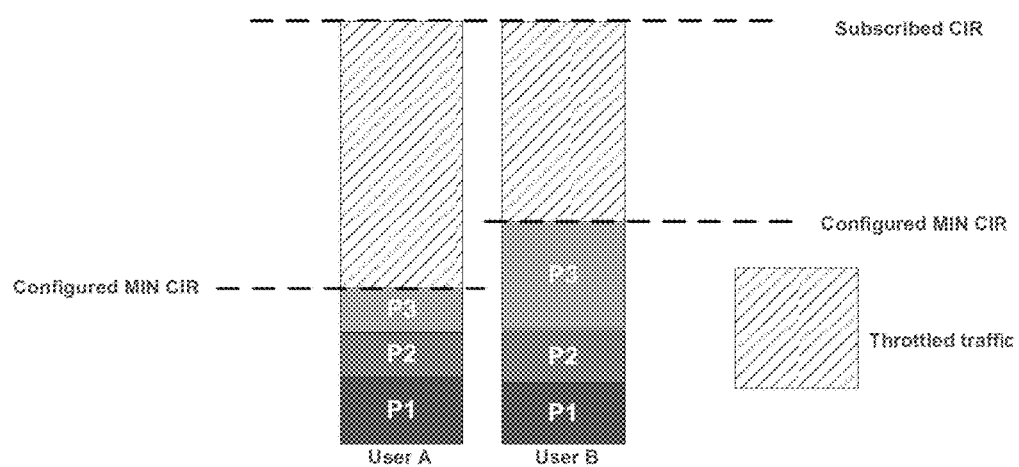
FIG. 9B is a diagrammatic representation of throttling and a corresponding table of conditions in accordance with a second embodiment of the technology disclosed herein.

FIG. 9B illustrates an example use case scenario showing the impact of a minimum CIR configuration when determining flow control action. User A is subscribed to a low value service plan that provides a low minimum CIR. User B is subscribed to a higher value service plan with a higher committed service level (minimum CIR). Both users A and B have subscribed to the same CIR. At an instant of time during a period of congestion, users A and B have the same amount of overall demand (high at the peak information rate (PIR)) and a comparable traffic mix. User A will experience a higher degree of throttling than User B.

Figure 9C:
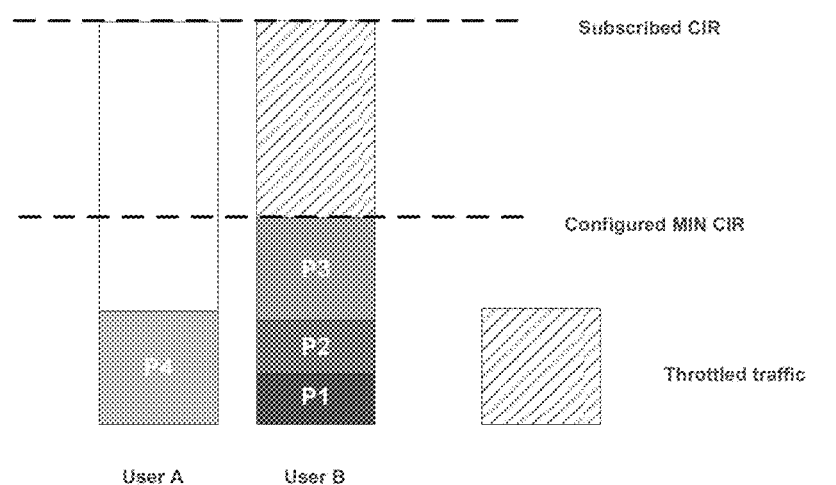
FIG. 9C is a diagrammatic representation of throttling and a corresponding table of conditions in accordance with still a third embodiment of the technology disclosed herein

FIG. 9C is another example use case scenario illustrating the impact of offered load when determining flow control action. Both user A and user B are subscribed to the same service plan throttle rate, subscribed CIR rate, and minimum CIR rate. During a period of congestion, user B has a high traffic load (at the PIR) while user A has a low traffic load. Both users A and B have a preponderance of low priority traffic. The level of congestion is such that it requires throttling of only lower priority traffic. As shown in FIG. 9C, traffic from user B will be throttled such that the total delivered traffic does not exceed the minimum CIR. User A's demand is below the configured MIN CIR, and therefore user A traffic will not be throttled at all.

Figure 9D:
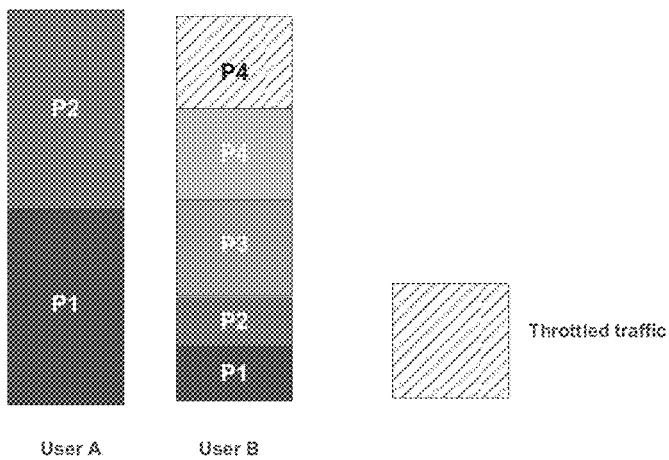
FIG. 9D is a diagrammatic representation of throttling and a corresponding table of conditions in accordance with a fourth embodiment of the technology disclosed herein

FIG. 9D is yet another example illustrating the impact of traffic mix when determining flow control action regarding users within the same service plan and the same service plan group. Both user A and user B are subscribed to the same service plan throttle rate, subscribed CIR rate, and minimum CIR rate. At an instant of time during a congestion period, they have the same amount of overall demand. User A has only high priority P1 and P2 traffic, whereas user B has a broad mix of traffic, P1, P2, P3, P4, a preponderance thereof being low priority traffic. Lowest priority traffic is served after serving higher priority traffic, and during periods of congestion, lower priority traffic is therefore first to experience higher latency and require a throttling of incoming traffic. In a period of light congestion, the system may throttle only traffic of the lowest priority (P4). Therefore, as shown in FIG. 9D, P4 traffic from user B has been throttled and no traffic from user A is throttled. The overall demand from user A is served completely, whereas user B's traffic is throttled. This use case scenario illustrates the possibility for differentiating throttling among the same type of users having the same total demand due to the difference in traffic mix across priorities.

Figure 9E:
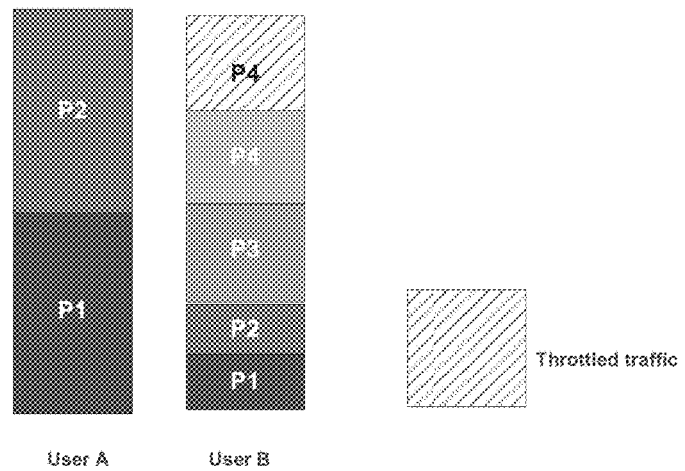
FIG. 9E is a diagrammatic representation of throttling and a corresponding table of conditions in accordance with a fifth embodiment of the technology disclosed herein

FIG. 9E illustrates the example impact of traffic mix when determining flow control action among users within different service plan groups. User A is subscribed to a low value service plan with a high throttle rate. User B is subscribed to a high value service plan with a low throttle rate. During a period of congestion, user A and user B have the same amount of overall demand/traffic load. However, user A has only high priority P1 and P2 traffic, whereas user B has a broad mix of traffic, P1, P2, P3, P4 with a preponderance of low priority traffic. Lowest priority traffic is served after serving higher priority traffic. During periods of congestion, the lower priority traffic is therefore first to experience higher latency and require a throttling of incoming traffic. During a period of light congestion, the system may throttle only the lowest priority (P4). Therefore, as shown in FIG. 9E, traffic from user B has been throttled and no traffic from user A is throttled despite user B subscribing to a higher value service plan. This use case scenario illustrates the ability to differentiate throttling even among different types of users due to the difference in traffic mix.

Figure 10:
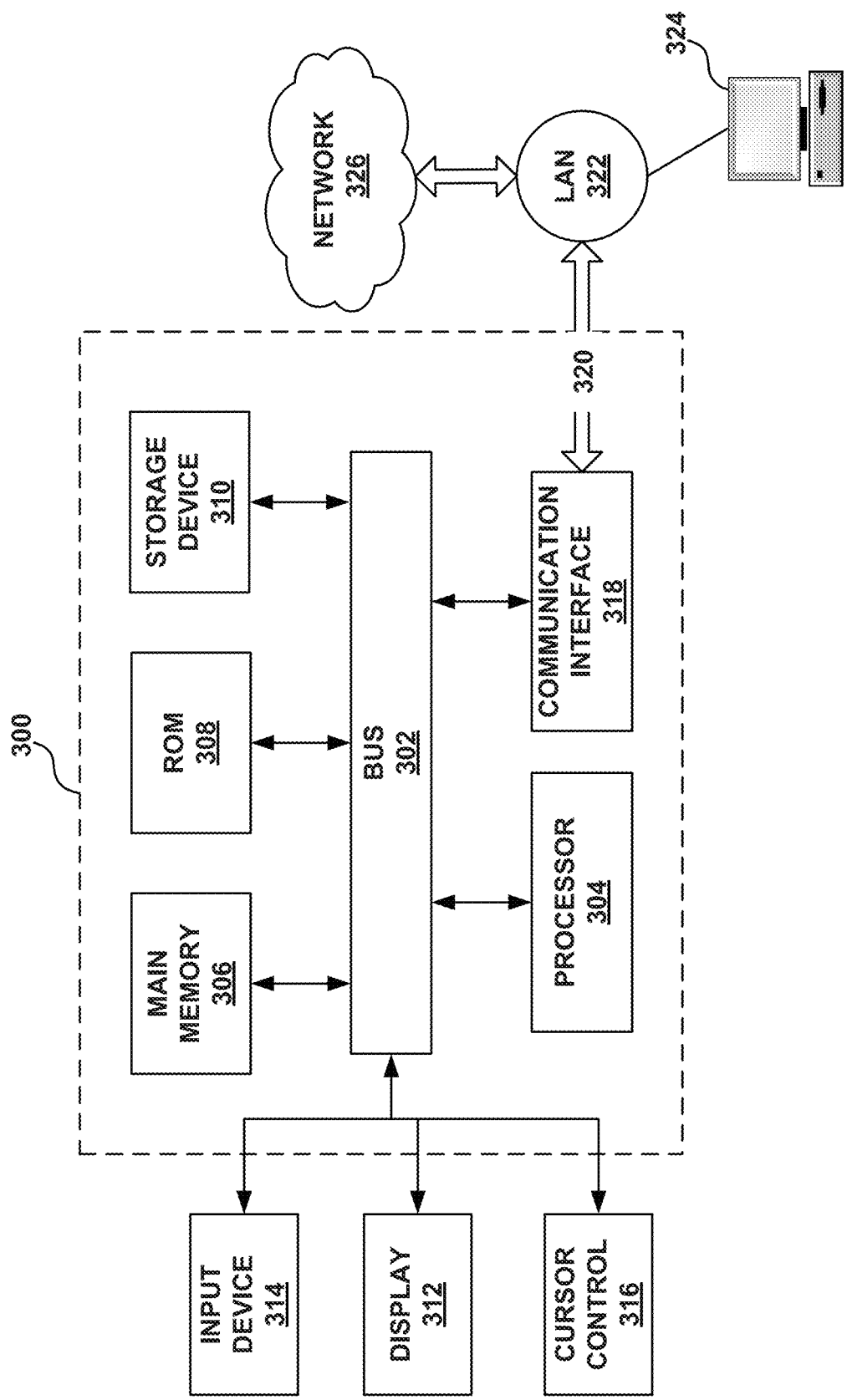
FIG. 10 illustrates an example computing module that may be used in implementing features of various embodiments.

FIG. 10 illustrates a computer system 300 upon which example embodiments according to the present technology disclosed herein can be implemented. Computer system 300 can include a bus 302 or other communication mechanism for communicating information, and a processor 304 coupled to bus 302 for processing information. Computer system 300 may also include main memory 306, such as a random access memory (RAM) or other dynamic storage device, coupled to bus 302 for storing information and instructions to be executed by processor 304. Main memory 306 can also be used for storing temporary variables or other intermediate information during execution of instructions to be executed by processor 304. Computer system 300 may further include a read only memory (ROM) 308 or other static storage device coupled to bus 302 for storing static information and instructions for processor 304. A storage device 310, such as a magnetic disk or optical disk, may additionally be coupled to bus 302 for storing information and instructions.

Computer system 300 can be coupled via bus 302 to a display 312, such as a cathode ray tube (CRT), liquid crystal display (LCD), active matrix display, light emitting diode (LED)/organic LED (OLED) display, digital light processing (DLP) display, or plasma display, for displaying information to a computer user. An input device 314, such as a keyboard including alphanumeric and other keys, may be coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312.

According to one embodiment, traffic throttling, in accordance with example embodiments, are provided by computer system 300 in response to processor 304 executing an arrangement of instructions contained in main memory 306. Such instructions can be read into main memory 306 from another computer-readable medium, such as storage device 310. Execution of the arrangement of instructions contained in main memory 306 causes processor 304 to perform one or more processes described herein. One or more processors in a multi-processing arrangement may also be employed to execute the instructions contained in main memory 306. In alternative embodiments, hard-wired circuitry is used in place of or in combination with software instructions to implement various embodiments. Thus, embodiments described in the present disclosure are not limited to any specific combination of hardware circuitry and software.

Computer system 300 may also include a communication interface 318 coupled to bus 302. Communication interface 318 can provide a two-way data communication coupling to a network link 320 connected to a local network 322. By way of example, communication interface 318 may be a digital subscriber line (DSL) card or modem, an integrated services digital network (ISDN) card, a cable modem, or a telephone modem to provide a data communication connection to a corresponding type of telephone line. As another example, communication interface 318 may be a local area network (LAN) card (e.g. for Ethernet™ or an Asynchronous Transfer Model (ATM) network) to provide a data communication connection to a compatible LAN. Wireless links can also be implemented. In any such implementation, communication interface 318 sends and receives electrical, electromagnetic, or optical signals that carry digital data streams representing various types of information. Further, communication interface 318 may include peripheral interface devices, such as a Universal Serial Bus (USB) interface, a PCMCIA (Personal Computer Memory Card International Association) interface, etc.

Network link 320 typically provides data communication through one or more networks to other data devices. By way of example, network link 320 can provide a connection through local network 322 to a host computer 324, which has connectivity to a network 326 (e.g. a wide area network (WAN) or the global packet data communication network now commonly referred to as the "Internet") or to data equipment operated by service provider. Local network 322 and network 326 may both use electrical, electromagnetic, or optical signals to convey information and instructions. The signals through the various networks and the signals on network link 320 and through communication interface 318, which communicate digital data with computer system 300, are example forms of carrier waves bearing the information and instructions.

Computer system 300 may send messages and receive data, including program code, through the network(s), network link 320, and communication interface 318. In the Internet example, a server (not shown) might transmit requested code belonging to an application program for implementing an embodiment of the technology disclosed herein through network 326, local network 322 and communication interface 318. Processor 304 executes the transmitted code while being received and/or store the code in storage device 310, or other non-volatile storage for later execution. In this manner, computer system 300 obtains application code in the form of a carrier wave.

The term "computer-readable medium" as used herein refers to any medium that participates in providing instructions to processor 304 for execution. Such a medium may take many forms, including but not limited to non-volatile media, volatile media, and transmission media. Non-volatile media include, for example, optical or magnetic disks, such as storage device 310. Volatile media may include dynamic memory, such as main memory 306. Transmission media may include coaxial cables, copper wire and fiber optics, including the wires that comprise bus 302. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 11:
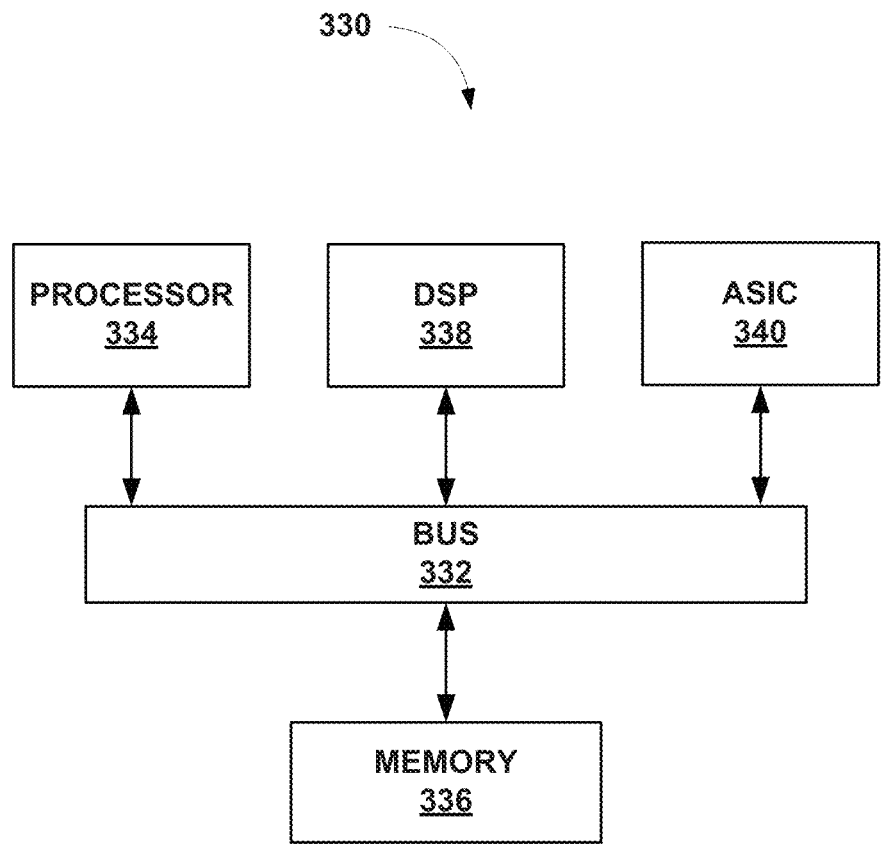
FIG. 11 illustrates an example chip set that can be utilized in implementing architectures and methods for dynamic bandwidth allocation in accordance with various embodiments.

FIG. 11 illustrates a chip set 330 in which embodiments of the technology disclosed herein may be implemented. Chip set 330 can include, for instance, processor and memory components described with respect to FIG. 11 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 330 includes a communication mechanism such as a bus 332 for passing information among the components of the chip set 330. A processor 334 has connectivity to bus 332 to execute instructions and process information stored in a memory 336. Processor 334 includes one or more processing cores with each core configured to perform independently. A multi-core processor enables multiprocessing within a single physical package. Examples of a multi-core processor include two, four, eight, or greater numbers of processing cores. Alternatively or in addition, processor 334 includes one or more microprocessors configured in tandem via bus 332 to enable independent execution of instructions, pipelining, and multithreading. Processor 332 may also be accompanied with one or more specialized components to perform certain processing functions and tasks such as one or more digital signal processors (DSP) 338, and/or one or more application-specific integrated circuits (ASIC) 340. DSP 338 can typically be configured to process real-world signals (e.g., sound) in real time independently of processor 1004. Similarly, ASIC 340 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 334 and accompanying components have connectivity to the memory 336 via bus 332. Memory 336 includes both dynamic memory (e.g., RAM) and static memory (e.g., ROM) for storing executable instructions that, when executed by processor 334, DSP 338, and/or ASIC 340, perform the process of example embodiments as described herein. Memory 1006 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. Examples of computing module or systems are shown in FIGS. 10 and 11. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
determining a per service plan group flow control meter (FCM) value applicable to all service plans in a service plan group comprising a plurality of service plans, wherein each of the plurality of service plans comprises a subscribed committed information rate (CIR) and minimum CIR;
determining a per service plan FCM value for each of the plurality of service plans in the service plan group; and
adjusting the per service plan FCM value to account for priorities of traffic served by the plurality of service plans,
wherein determining the per service plan group FCM value comprises converting a traffic priority based FCM value to the per service plan group FCM value in accordance with a configured flow control weight value.

2. The method of claim 1, wherein the per service plan group FCM value is a percentage value.

3. The method of claim 2, wherein determining the per-service-plan FCM comprises comparing a minimum FCM value configured for each service plan with the per service plan group FCM value, and obtaining the larger of the minimum FCM value or the per service group FCM value.

4. The method of claim 3, further comprising calculating an average throttled data rate indicative of whether traffic is under throttled or over throttled with a currently configured flow control weight value and minimum FCM value.

5. The method of claim 4, wherein the average throttled data rate is determined by subtracting the traffic priority based FCM value from the per service plan FCM value, and multiplying the resulting value with per service plan total input data rate.

6. The method of claim 5, wherein the per service plan total input data rate comprises the product of a runtime input data rate value and a value indicative of the number of users within an Internet Protocol Gateway (IPGW) belonging to each of the service plans.

7. The method of claim 6, wherein the runtime input data rate value is indicative of a pre-configured un-throttled data rate associated with each of the service plans.

8. The method of claim 6, wherein adjusting the per-service-plan FCM value comprises determining a delta FCM value indicative of a priority queue corresponding to an uplink queue maintained within the IPGW.

9. The method of claim 8, further comprising determining a delta FCM value indicative of the service plan within the priority queue and based upon the delta FCM value indicative of the priority queue.

10. A system, comprising:
a plurality of Internet Protocol Gateways (IPGWs); and
a satellite gateway (SGW) configured to transmit and receive data packets to and from the plurality of IPGWs, the SGW controlling traffic flow by transmitting flow control messages to each of the plurality of IPGWs;
wherein each of the plurality of IPGWs is configured to throttle the traffic flow to the SGW during periods of outroute congestion by performing the following:
determine a per service plan group flow control meter (FCM) value applicable to all service plans supported by the system in a service plan group comprising a plurality of service plans, wherein each of the plurality of service plans comprises a subscribed committed information rate (CIR) and minimum CIR;
determine a per service plan FCM value for each of the plurality of service plans in the service plan group; and
adjust the per service plan FCM value to account for priorities of traffic served by the plurality of service plans,
wherein each of the plurality of IPGWs determines the per service plan group FCM value by converting a traffic priority based FCM value to the per service plan group FCM value according to the following equation:

$$gFCM[p,g]=FCM[p]*w[g]/100$$

where gFCM[p,g] is the per service plan group FCM value, FCM[p] is the traffic priority based FCM value, w[g] is a flow control weight value, p is a priority of an uplink queue in each of the plurality of IPGWs associated with a corresponding traffic priority queue maintained in the SGW, g is a service plan group identifier, and f is a service plan identifier.

11. The system of claim 10, wherein each of the IPGWs determines the per service plan FCM value according to the following equation:

$$sFCM[p,f]=MAX(mFCM[f], gFCM[p,g])$$

where sFCM[p,f] is the per-service-plan FCM value, and mFCM[f] is a minimum FCM value configured for the service plan.

12. The system of claim 11, wherein each of the plurality of IPGWs is further configured to calculate an average throttled data rate indicative of whether traffic is under throttled or over throttled according to the following equation:

$$bw_{avg}=\Sigma((sFCM[f]-FCM)*(BW[f]*N[f]))$$

where $bw_{avg}$ is the average throttled data rate, FCM is a traffic priority based FCM value, sFCM[f] is the per-service-plan FCM value, BW[f] is a runtime input data rate, and N[f] is the number of users in each of the IPGWs belonging to the service plan.

13. The system of claim 12, wherein the runtime input data rate value is indicative of a pre-configured un-throttled data rate associated with the service plan.

14. The system of claim 13, wherein each of the plurality of IPGWs is further configured to determine a delta FCM value indicative of the traffic priority queue according to the following equation:

$$dFCM_{global} = (-1) * bw_{avg}/(BW[f]*N[f])$$

where $dFCM_{global}$ is the delta FCM value indicative of the traffic priority queue.

15. The system of claim 14, wherein each of the plurality of IPGWs is configured to determine a delta FCM value indicative of the service plan within the traffic priority queue according to the following equation:

$$dFCM[f] = dFCM_{global} * (sFCM[f]/sFCM[f]*N[f])$$

where $dFCM[f]$ is the delta FCM value indicative of the service plan within the traffic priority queue.

16. The system of claim 15, where each of the plurality of IPGWs is configured to adjust the per service plan FCM value according to the following equation:

$$sFCM[f]' = sFCM + dFCM[f]$$

where $sFCM[f]'$ is the adjusted per service plan FCM value.

17. The system of claim 10, wherein the throttling of traffic flow to the SGW during periods of outroute congestion does not fall below a minimum configured committed information rate.

18. The system of claim 10, wherein each of the plurality of IPGWs is configured to adjust the per service plan FCM value every flow control cycle.

\* \* \* \* \*